US010894436B2

(12) United States Patent
Takahashi et al.

(10) Patent No.: US 10,894,436 B2
(45) Date of Patent: Jan. 19, 2021

(54) THERMAL TRANSFER APPARATUS

(71) Applicant: Roland DG Corporation, Hamamatsu (JP)

(72) Inventors: Fumihiro Takahashi, Hamamatsu (JP); Arata Mukunoki, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 239 days.

(21) Appl. No.: 16/143,563

(22) Filed: Sep. 27, 2018

(65) Prior Publication Data

US 2019/0111720 A1 Apr. 18, 2019

(30) Foreign Application Priority Data

Oct. 13, 2017 (JP) .................................. 2017-199464

(51) Int. Cl.
| | | |
|---|---|---|
| *B41M 5/382* | (2006.01) | |
| *B41M 5/46* | (2006.01) | |
| *B44C 1/17* | (2006.01) | |
| *B44C 1/24* | (2006.01) | |
| *B41F 16/00* | (2006.01) | |

(Continued)

(52) U.S. Cl.
CPC ....... *B41M 5/38214* (2013.01); *B41F 16/006* (2013.01); *B41F 16/0046* (2013.01); *B41M 5/46* (2013.01); *B44C 1/1716* (2013.01); *B44C 1/24* (2013.01); *B29C 65/16* (2013.01); *B29C 66/814* (2013.01); *B41M 2205/32* (2013.01)

(58) Field of Classification Search
CPC .............. B41F 16/0046; B41F 16/006; B41M 2205/32; B41M 5/38214; B41M 5/46; B44C 1/1716; B44C 1/24; B29C 66/814; B29C 65/16
See application file for complete search history.

(56) References Cited

U.S. PATENT DOCUMENTS 9,862,141 B2 * 1/2018 Marinov ............. B29C 65/1606
2018/0111402 A1 * 4/2018 Takahashi ............. B41J 11/007
(Continued)

FOREIGN PATENT DOCUMENTS

| JP | 01-299057 A | 12/1989 |
|---|---|---|
| JP | 11-300991 A | 11/1999 |

(Continued)

OTHER PUBLICATIONS

Decision to Grant Patent for JP2017-199464 (dated 2019).*

*Primary Examiner* — Sonya M Sengupta
(74) *Attorney, Agent, or Firm* — Keating & Bennett, LLP (57) ABSTRACT

A thermal transfer apparatus includes a fixture, a foil securing film, a film retainer, a foil transfer tool, and a carriage conveyor. The fixture retains a transfer object. The foil securing film is disposed above the fixture. The foil securing film allows light to pass therethrough. The foil securing film presses, from above, a thermal transfer foil on the transfer object so as to secure the thermal transfer foil onto the transfer object. The film retainer retains the foil securing film. The film retainer moves the foil securing film in an up-down direction relative to the fixture. The foil transfer tool presses the foil securing film and the thermal transfer foil on the transfer object. The foil transfer tool emits light to the foil securing film. The carriage conveyor moves the foil transfer tool relative to the fixture.

10 Claims, 6 Drawing Sheets

(51) Int. Cl.
*B29C 65/00* (2006.01)
*B29C 65/16* (2006.01)

(56) References Cited

U.S. PATENT DOCUMENTS

| | | | | |
|---|---|---|---|---|
| 2018/0111409 A1* | 4/2018 | Takahashi | ............. | B44C 1/1729 |
| 2019/0001739 A1* | 1/2019 | Takahashi | ............. | B41F 16/008 |
| 2019/0111720 A1* | 4/2019 | Takahashi | ............. | B44C 1/1716 |
| 2020/0039239 A1* | 2/2020 | Takahashi | ............. | B44C 1/1712 |
| 2020/0114635 A1* | 4/2020 | Takahashi | ............... | B32B 41/00 |

FOREIGN PATENT DOCUMENTS

| | | | |
|---|---|---|---|
| JP | 5926083 B2 | | 5/2016 |
| JP | 5931555 B2 | | 6/2016 |
| JP | 2016-215599 A | | 12/2016 |
| JP | 2016215599 A | * | 12/2016 |

\* cited by examiner

THERMAL TRANSFER APPARATUS

CROSS REFERENCE TO RELATED APPLICATIONS

This application claims the benefit of priority to Japanese Patent Application No. 2017-199464 filed on Oct. 13, 2017. The entire contents of this application are hereby incorporated herein by reference.

BACKGROUND OF THE INVENTION

1. Field of the Invention

The present invention relates generally to thermal transfer apparatuses. More particularly, the present invention relates to a thermal transfer apparatus to transfer a thermal transfer foil to a transfer object.

2. Description of the Related Art

A decorative process known in the related art involves performing a thermal transfer method using a thermal transfer foil (which may also be referred to as a "thermal transfer sheet") with the aim of improving design, for example. A thermal transfer foil includes, as main components, a base, a decorative layer, and an adhesive layer stacked in this order. As used herein, the term "foil transfer" refers to transfer of a thermal transfer foil to a transfer object. Foil transfer involves: placing a thermal transfer foil on a transfer object such that the adhesive layer of the thermal transfer foil comes into contact with the transfer object; and emitting light to the thermal transfer foil from a laser light emitting tool (e.g., a laser pen), with the thermal transfer foil being pressed from above by the tool, so as to heat the thermal transfer foil. This causes the adhesive layer included in a portion of the thermal transfer foil pressed by the tool to melt and adhere to the surface of the transfer object. The adhesive layer is then cured by heat dissipation. Thus, removing the base of the thermal transfer foil from the transfer object enables the decorative layer having a shape corresponding to a hot-stamped portion to adhere, together with the adhesive layer, to the transfer object. Consequently, the surface of the transfer object is decorated with, for example, a desired pattern.

JP 2016-215599 A, for example, discloses a technique to transfer foil to a transfer object using a laser light emitting tool.

Foil transfer involves moving a laser light emitting tool while emitting light to a thermal transfer foil from the tool, with the thermal transfer foil being pressed from above by the tool. Unfortunately, accidental movement of the thermal transfer foil relative to a transfer object during this operation makes it impossible to suitably perform foil transfer. Thus, the thermal transfer foil needs to be secured to the transfer object. Japanese Patent No. 5931555, for example, discloses a technique to secure a thermal transfer foil to a transfer object using an electrostatic absorption sheet. Japanese Patent No. 5926083 discloses a technique to secure a thermal transfer foil to a transfer object using a suction pump, for example.

The technique disclosed in Japanese Patent No. 5931555 unfortunately requires a special facility to effect electrostatic absorption. The technique disclosed in Japanese Patent No. 5926083 unfavorably requires a special facility to effect vacuum absorption. These techniques may thus increase the complexity and size of a thermal transfer apparatus, leading to an increase in cost.

SUMMARY OF THE INVENTION

Accordingly, preferred embodiments of the present invention provide thermal transfer apparatuses that each enable, with a simple structure, a thermal transfer foil to be secured to a transfer object.

A preferred embodiment of the present invention provides a thermal transfer apparatus including a stand, a foil securing film, a film retainer, a foil transfer tool, and a conveyor. The stand is structured to retain a transfer object. The foil securing film is disposed above the stand. The foil securing film allows light to pass therethrough. The foil securing film presses, from above, a thermal transfer foil on the transfer object so as to secure the thermal transfer foil onto the transfer object. The film retainer retains the foil securing film. The film retainer moves the foil securing film in an up-down direction relative to the stand. The foil transfer tool presses the foil securing film and the thermal transfer foil on the transfer object and to emit light to the foil securing film. The conveyor moves one of the stand and the foil transfer tool relative to the other one of the stand and the foil transfer tool.

The thermal transfer apparatus according to the present preferred embodiment enables the film retainer to move the foil securing film in the up-down direction relative to the stand. Thus, with the thermal transfer foil placed on the transfer object retained by the stand, moving the foil securing film downward enables the foil securing film to press the thermal transfer foil from above. This secures the thermal transfer foil onto the transfer object so as to prevent movement of the thermal transfer foil relative to the transfer object. Because the foil securing film allows light to pass therethrough, the light emitted from the foil transfer tool to the foil securing film passes through the foil securing film and reaches the thermal transfer foil. This heats the thermal transfer foil so as to transfer the thermal transfer foil to the transfer object. Consequently, the thermal transfer apparatus according to the present preferred embodiment effects foil transfer while reliably securing the thermal transfer foil to the transfer object with the foil securing film.

Various preferred embodiments of the present invention provide thermal transfer apparatuses that each enable, with a simple structure, a thermal transfer foil to be secured to a transfer object.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A first preferred embodiment of the present invention will be described below with reference to the drawings. Preferred embodiments of the present invention described below are naturally not intended to limit the present invention in any way. Components or elements having the same functions are identified by the same reference signs, and description thereof will be simplified or omitted when deemed redundant.

Figure 1:
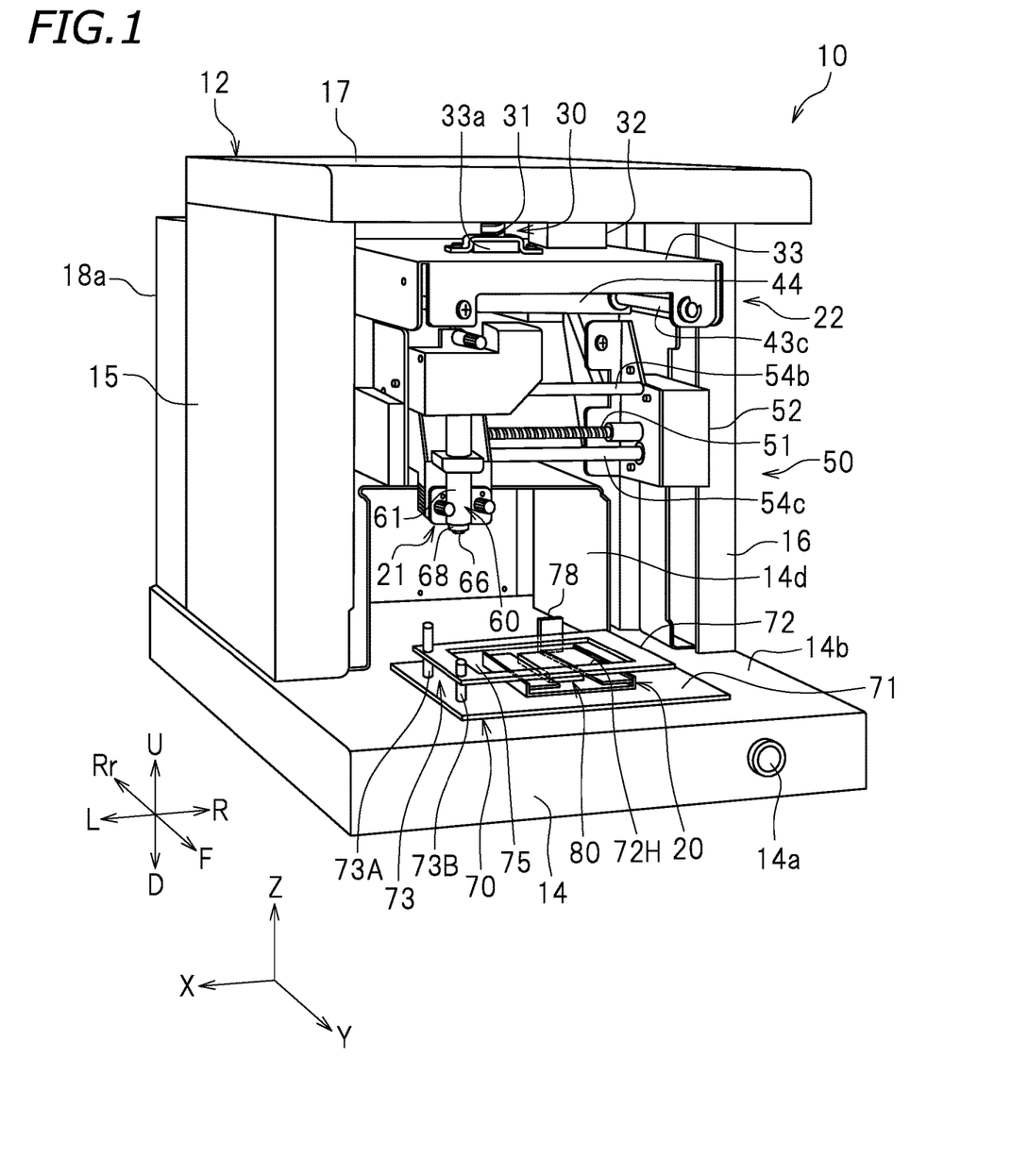
FIG. 1 is a schematic perspective view of a thermal transfer apparatus according to a first preferred embodiment of the present invention.
Figure 2:
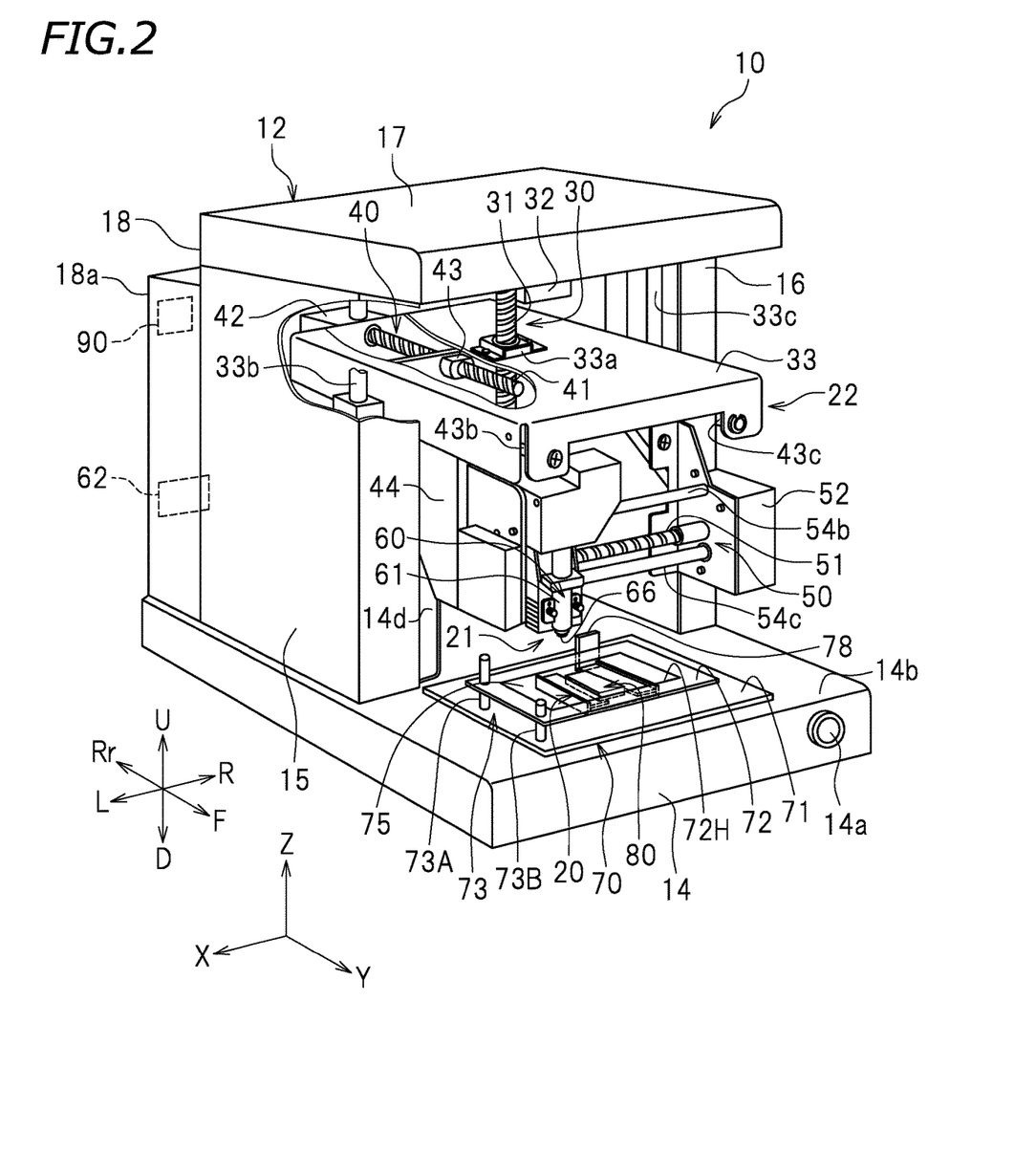
FIG. 2 is a partially cutaway schematic perspective view of the thermal transfer apparatus according to the first preferred embodiment of the present invention.
Figure 3:
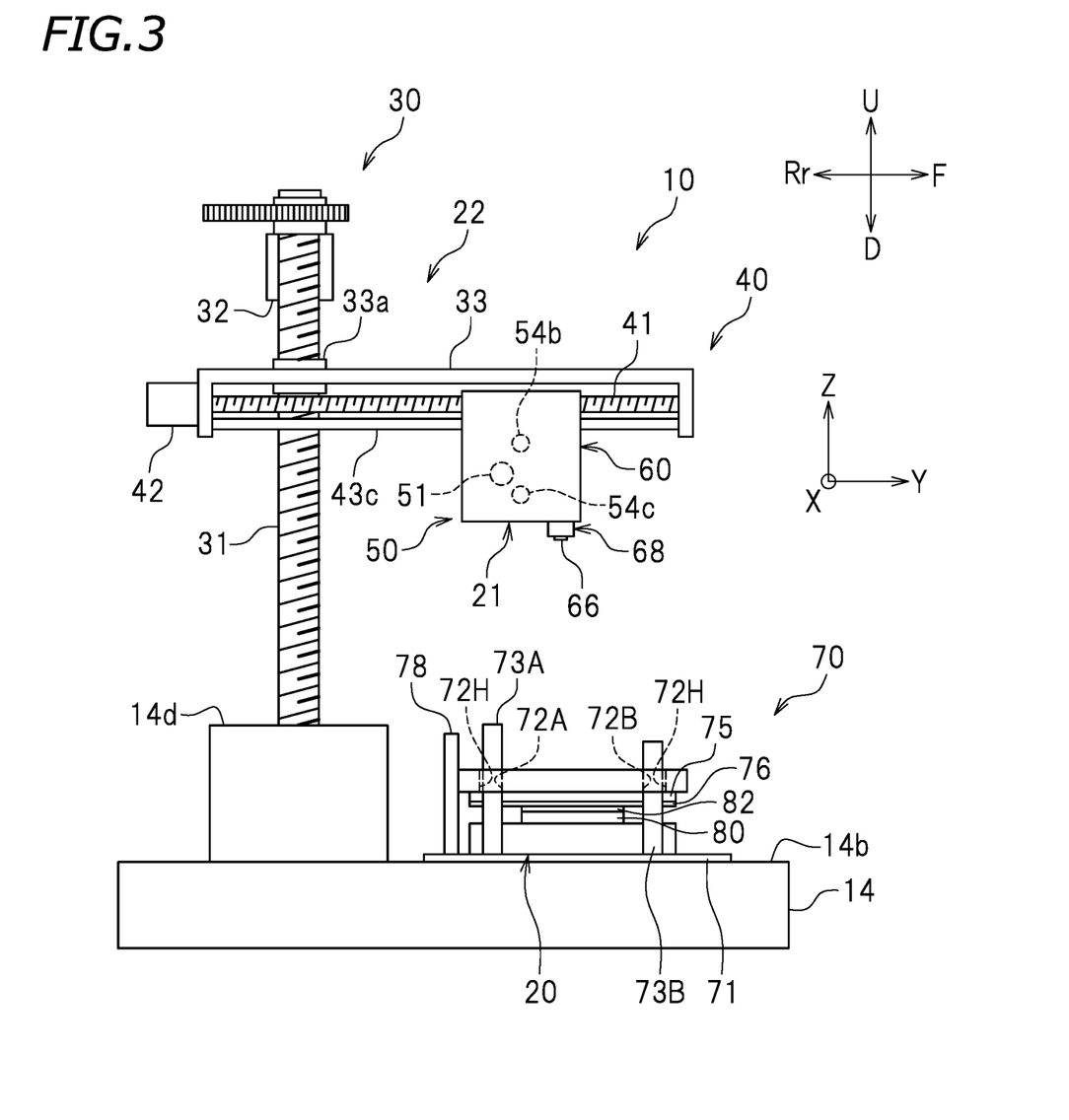
FIG. 3 is a schematic left side view of a carriage conveyor according to the first preferred embodiment of the present invention.

First, a thermal transfer apparatus 10 according to the first preferred embodiment of the present invention will be described below. FIG. 1 is a perspective view of the thermal transfer apparatus 10. FIG. 2 is a partially cutaway schematic perspective view of the thermal transfer apparatus 10. FIG. 3 is a schematic left side view of a carriage conveyor 22. As used herein, the terms "right", "left", "up", and "down" respectively refer to right, left, up, and down with respect to an operator (or a user) facing the front of the thermal transfer apparatus 10 and looking at a power switch 14a. A direction from the operator toward the rear of the thermal transfer apparatus 10 is a rearward direction. A direction from the rear of the thermal transfer apparatus 10 toward the operator is a forward direction. The reference signs F, Rr, R, L, U, and D in the drawings respectively represent front, rear, right, left, up, and down. Assuming that an X axis, a Y axis, and a Z axis are perpendicular to each other, the thermal transfer apparatus 10 according to the present preferred embodiment is disposed on a plane defined by the X axis and the Y axis. In the present preferred embodiment, the X axis extends in a right-left direction, the Y axis extends in a front-rear direction, and the Z axis extends in an up-down direction. These directions are defined merely for the sake of convenience of description and do not limit in any way how the thermal transfer apparatus 10 may be installed.

As illustrated in FIG. 3, a thermal transfer foil 82 placed on a transfer object 80 is secured with a foil securing film 75. In this state, the thermal transfer apparatus 10 presses and heats the thermal transfer foil 82, a light absorbing film 76, and the foil securing film 75 with a foil transfer tool 60 (which will be described below). Thus, the thermal transfer apparatus 10 transfers a decorative layer included in the thermal transfer foil 82 to the surface of the transfer object 80. In the present preferred embodiment, the foil transfer tool 60 indirectly presses the thermal transfer foil 82 through the foil securing film 75 and the light absorbing film 76. The use of the light absorbing film 76 is unnecessary depending on, for example, the materials, shapes, and/or structures of the transfer object 80 and the thermal transfer foil 82.

A material for the transfer object 80 is not limited to any particular material. The transfer object 80 is not limited to any particular shape. Examples of materials for the transfer object 80 may include: various types of resin, such as acrylic resin, polyvinyl chloride (PVC), polyethylene terephthalate (PET), and polycarbonate (PC); various types of paper, such as plain paper, drawing paper, and Japanese paper; various types of rubber; and various types of metal, such as gold, silver, copper, platinum, brass, aluminum, iron, titanium, and stainless steel.

In one example, any generally commercially available thermal transfer foil is usable as the thermal transfer foil 82 without any restraint. The thermal transfer foil 82 usually includes a base, a decorative layer, and an adhesive layer stacked in this order. Examples of the decorative layer of the thermal transfer foil 82 include: metallic foil, such as gold foil and silver foil; half-metallic foil; pigment foil; multi-color printing foil; hologram foil; and foil resistant to electrostatic discharge failure. The thermal transfer foil 82 is placed on the transfer object 80. The thermal transfer foil 82 may include a light absorbing layer between the base and the decorative layer. When the thermal transfer foil 82 includes such a light absorbing layer, the base is made of a transparent material. The light absorbing layer is similar in structure to the light absorbing film 76 (which will be described below). When the thermal transfer foil includes the light absorbing layer, the thermal transfer apparatus 10 does not necessarily have to include the light absorbing film 76. The thermal transfer apparatus 10 preferably includes the light absorbing film 76 even when the thermal transfer foil 82 includes the light absorbing layer.

As previously described, depending on the structure of the thermal transfer foil 82 to be used, the thermal transfer foil 82 may include no light absorbing layer that absorbs light emitted from a light source 62 of the foil transfer tool 60 or may include a light absorbing layer having a low light absorptivity. In such a case, a light absorber may be disposed on the upper surface of the thermal transfer foil 82. The light absorber is structured to efficiently absorb light (or laser light) of a predetermined wavelength range emitted from the light source 62 of the foil transfer tool 60, so as to enable conversion of light energy into thermal energy. The light absorber has heat resistance up to about 100° C. to about 200° C., for example. The light absorber has a thickness of about 1 μm to about 15 μm, for example. In one example, the light absorber may be a printed matter provided by printing on the foil securing film 75 or may be a film member separate from the foil securing film 75. The light absorbing film 76 is an example of the light absorber. In one example, the light absorbing film 76 is made of resin, such as polyimide.

The foil securing film 75 is a film to press the thermal transfer foil 82 from above so as to secure the thermal transfer foil 82 to the transfer object 80. In the present preferred embodiment, the foil securing film 75 presses the thermal transfer foil 82 from above through the light absorbing film 76. As used herein, the phrase "to press the thermal transfer foil 82 from above" not only refers to directly pressing the thermal transfer foil 82 by bringing the foil securing film 75 into direct contact with the thermal transfer foil 82, but also refers to indirectly pressing the thermal transfer foil 82 through, for example, the light absorbing film 76 by bringing the foil securing film 75 into direct contact with a film (such as the light absorbing film 76) other than the thermal transfer foil 82. The foil securing film 75 is disposed above a fixture 20 (which will be described below) to retain the transfer object 80. The foil securing film 75 is disposed on or above the light absorbing film 76. The foil securing film 75 is disposed closer to the foil transfer tool 60 than the light absorbing film 76. The foil securing film 75 is significantly lower in light absorptivity than the light absorbing film 76. The foil securing film 75 allows light to pass therethrough. In one example, the foil securing film 75 is transparent. The foil securing film 75 is higher in strength than the light absorbing film 76. In one example, the foil securing film 75 has a thickness of about 25 μm to about 100 μm. A material for the foil securing film 75 is not limited to any particular material. In one example, the foil securing film 75 is a plastic film, such as a polyester film.

As illustrated in FIG. 1, the thermal transfer apparatus 10 has a box shape, for example. The thermal transfer apparatus 10 includes a housing 12, the carriage conveyor 22, a carriage 21, the foil transfer tool 60, and a film retainer 70. The front portion of the housing 12 is provided with an opening. The carriage conveyor 22 is disposed in the housing 12. The housing 12 includes a bottom wall 14, a left side wall 15, a right side wall 16, an upper wall 17, and a rear wall 18 (see FIG. 2). In one example, the housing 12 is made of a single steel plate or a plurality of steel plates.

As illustrated in FIG. 1, the film retainer 70 is placed on the bottom wall 14. The front upper surface of the bottom wall includes a retainer placement region 14b where the film retainer 70 is to be placed. The fixture 20 is detachably attached to the film retainer 70. The fixture 20 may be secured in an undetachable manner to the film retainer 70. The fixture 20 defines and functions as a stand to retain the transfer object 80. Examples of the fixture 20 include a vise. The front surface of the bottom wall 14 is provided with the power switch 14a.

As illustrated in FIG. 2, the left side wall 15 extends upward from the left end of the bottom wall 14. The left side wall 15 extends in a direction perpendicular to the bottom wall 14. The right side wall 16 extends upward from the right end of the bottom wall 14. The right side wall 16 extends in a direction perpendicular to the bottom wall 14. The left side wall 15 and the right side wall 16 support the carriage 21 (which will be described below). The rear wall 18 extends upward from the rear end of the bottom wall 14. The rear wall 18 is connected to the rear end of the left side wall 15 and the rear end of the right side wall 16. The rear wall 18 is provided with a case 18a having a box shape. The case 18a houses a controller 90 (which will be described below). The upper wall 17 is connected to the upper end of the left side wall 15, the upper end of the right side wall 16, and the upper end of the rear wall 18. A portion of a first conveyor 30 (which will be described below) is disposed on the upper wall 17. A region surrounded by the bottom wall 14, the left side wall 15, the right side wall 16, the upper wall 17, and the rear wall 18 defines an inner space of the housing 12.

The inner space of the housing 12 is a space in which the thermal transfer foil 82 is to be transferred to the transfer object 80. The carriage 21 and the carriage conveyor 22 to three-dimensionally convey the carriage 21 are disposed in the inner space of the housing 12. The carriage conveyor 22 is an example of a conveyor. The carriage conveyor 22 includes: the first conveyor 30 to convey the carriage 21 in a Z-axis direction; a second conveyor 40 to convey the carriage 21 in a Y-axis direction; and a third conveyor 50 to convey the carriage 21 in an X-axis direction. The carriage 21 is movable relative to the fixture 20 (or the transfer object 80) by the first conveyor 30, the second conveyor 40, and the third conveyor 50. The first conveyor 30, the second conveyor 40, and the third conveyor 50 are disposed above the bottom wall 14.

As illustrated in FIG. 1, the first conveyor 30 conveys the carriage 21 in the Z-axis direction (i.e., the up-down direction). The first conveyor 30 is a screw feed mechanism including a Z-axis direction feed screw stock 31, a Z-axis direction feed motor 32, and a feed nut 33a. The Z-axis direction feed screw stock 31 extends along the Z axis. The Z-axis direction feed screw stock 31 includes a spiral thread groove. The upper portion of the Z-axis direction feed screw stock 31 is secured to the upper wall 17. The upper end of the Z-axis direction feed screw stock 31 passes through the lower surface of the upper wall 17 in the Z-axis direction such that a portion of the upper end of the Z-axis direction feed screw stock 31 is disposed in the upper wall 17. The lower end of the Z-axis direction feed screw stock 31 is rotatably supported by a frame 14d (see also FIG. 3). The frame 14d is secured onto the bottom wall 14. The Z-axis direction feed motor 32 is an electric motor. The Z-axis direction feed motor 32 is connected to the controller 90 (see FIG. 2). The Z-axis direction feed motor 32 is secured to the upper wall 17. The Z-axis direction feed motor 32 includes a drive shaft. The drive shaft passes through the lower surface of the upper wall 17 such that a portion of the drive shaft is disposed in the upper wall 17. The Z-axis direction feed screw stock 31 is coupled to the Z-axis direction feed motor 32 inside the upper wall 17. The Z-axis direction feed motor 32 rotates the Z-axis direction feed screw stock 31.

As illustrated in FIG. 2, the feed nut 33a is threaded and in mesh with the Z-axis direction feed screw stock 31. The feed nut 33a is coupled to a raising and lowering base 33. The feed nut 33a passes through the upper surface of the raising and lowering base 33 in the Z-axis direction. The raising and lowering base 33 is supported by the Z-axis direction feed screw stock 31 through the feed nut 33a. The raising and lowering base 33 is disposed in parallel or substantially in parallel with the bottom wall 14. The length of the raising and lowering base 33 in the X-axis direction is shorter than the length of the retainer placement region 14b in the X-axis direction. The length of the raising and lowering base 33 in the Y-axis direction is longer than the length of the retainer placement region 14b in the Y-axis direction. A slide shaft 33b is disposed inward of the left side wall 15. A slide shaft 33c is disposed inward of the right side wall 16. The slide shafts 33b and 33c each extend in the Z-axis direction. The slide shafts 33b and 33c are disposed in parallel or substantially in parallel with the Z-axis direction feed screw stock 31. The raising and lowering base 33 is slidable in the Z-axis direction along the slide shafts 33b and 33c. Driving the Z-axis direction feed motor 32 rotates the Z-axis direction feed screw stock 31. The rotation of the Z-axis direction feed screw stock 31 moves the raising and lowering base 33 in the up-down direction along the slide shafts 33b and 33c. In the present preferred embodiment, the second conveyor 40 and the third conveyor 50 are coupled to the raising and lowering base 33. Thus, the second conveyor 40 and the third conveyor 50 move together in the up-down direction in accordance with the movement of the raising and lowering base 33 in the up-down direction.

As illustrated in FIG. 2, the second conveyor 40 conveys the carriage 21 in the Y-axis direction (i.e., the front-rear direction). The second conveyor 40 is a screw feed mechanism including a Y-axis direction feed screw stock 41, a Y-axis direction feed motor 42, and a feed nut 43. The Y-axis direction feed screw stock 41 extends along the Y axis. The Y-axis direction feed screw stock 41 is disposed on the raising and lowering base 33. The Y-axis direction feed screw stock 41 includes a spiral thread groove. The rear end of the Y-axis direction feed screw stock 41 is coupled to the Y-axis direction feed motor 42. The Y-axis direction feed motor 42 is an electric motor. The Y-axis direction feed motor 42 is connected to the controller 90. The Y-axis direction feed motor 42 is secured to the rear portion of the raising and lowering base 33. The Y-axis direction feed motor 42 rotates the Y-axis direction feed screw stock 41. The feed nut 43 is threaded and in mesh with the thread groove of the Y-axis direction feed screw stock 41. The raising and lowering base 33 is provided with a pair of slide shafts 43b and 43c extending in the Y-axis direction. The two slide shafts 43b and 43c are disposed in parallel or substantially in parallel with the Y-axis direction feed screw stock 41. The second conveyor 40 includes a slide base 44 slidable in the Y-axis direction along the slide shafts 43b and 43c. Driving the Y-axis direction feed motor 42 rotates the Y-axis direction feed screw stock 41. The rotation of the Y-axis direction feed screw stock 41 moves the slide base 44 in the front-rear direction along the slide shafts 43b and 43c.

As illustrated in FIG. 1, the third conveyor 50 conveys the carriage 21 in the X-axis direction (i.e., the right-left direction). The third conveyor 50 is a screw feed mechanism including an X-axis direction feed screw stock 51, an X-axis direction feed motor 52, and a feed nut (not illustrated). The X-axis direction feed screw stock 51 extends along the X axis. The X-axis direction feed screw stock 51 is disposed in front of the slide base 44. The X-axis direction feed screw stock 51 includes a spiral thread groove. An end of the X-axis direction feed screw stock 51 is coupled to the X-axis direction feed motor 52. The X-axis direction feed motor 52 is an electric motor. The X-axis direction feed motor 52 is connected to the controller 90 (see FIG. 2). The slide base 44 includes a right side wall surface facing forward. The X-axis direction feed motor 52 is secured to the right side wall surface of the slide base 44. The X-axis direction feed motor 52 rotates the X-axis direction feed screw stock 51. The feed nut of the third conveyor 50 is threaded and in mesh with the thread groove of the X-axis direction feed screw stock 51. The third conveyor 50 includes a pair of slide shafts 54b and 54c disposed in front of the slide base 44. The slide shafts 54b and 54c each extend in the X-axis direction. The two slide shafts 54b and 54c are disposed in parallel or substantially in parallel with the X-axis direction feed screw stock 51. The carriage 21 is slidable in the X-axis direction along the slide shafts 54b and 54c. Driving the X-axis direction feed motor 52 rotates the X-axis direction feed screw stock 51. The rotation of the X-axis direction feed screw stock 51 moves the carriage 21 in the right-left direction along the slide shafts 54b and 54c.

Figure 4:
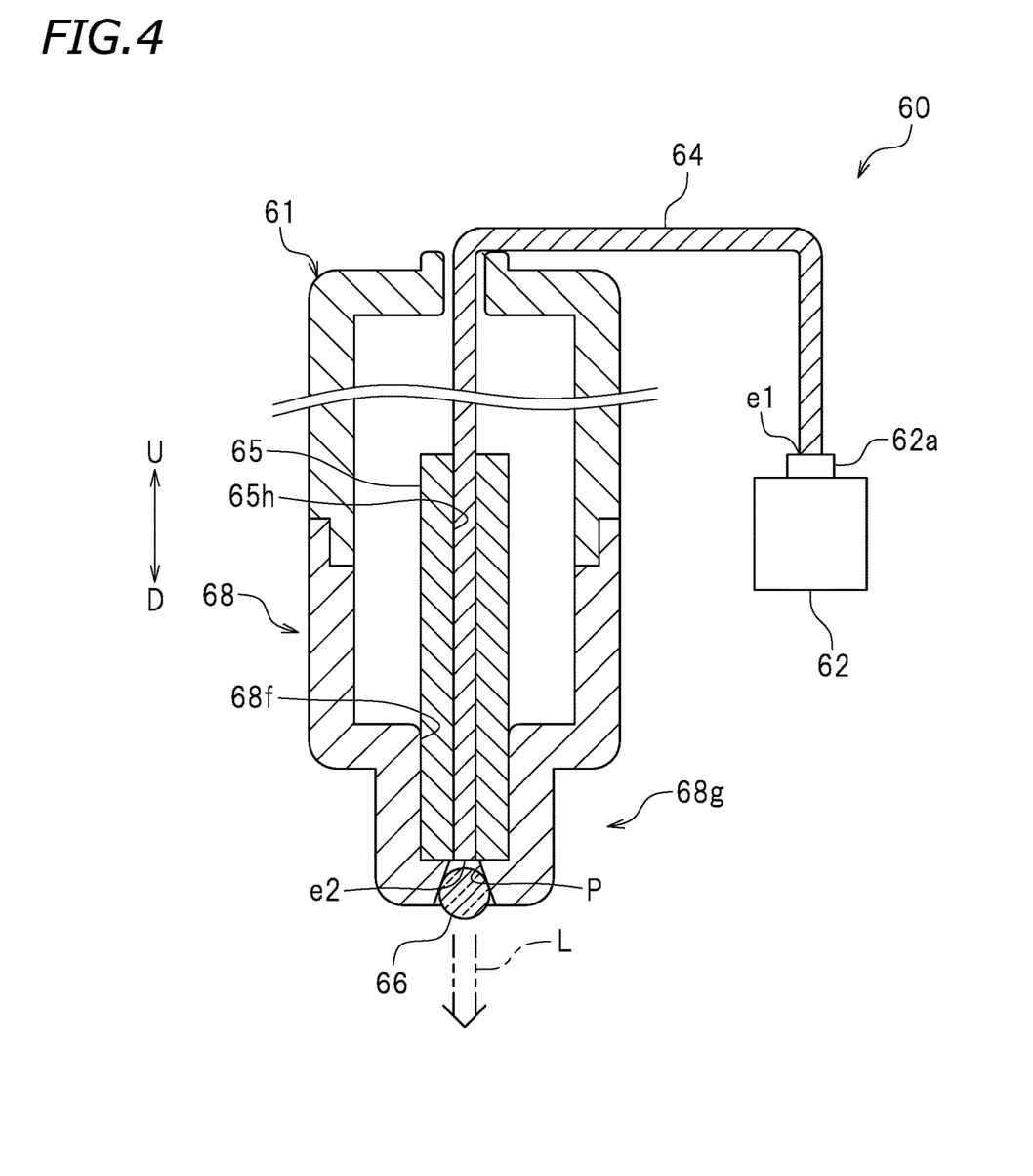
FIG. 4 is a schematic cross-sectional view of a foil transfer tool according to the first preferred embodiment of the present invention.

FIG. 4 is a schematic cross-sectional view of the foil transfer tool 60 according to the first preferred embodiment of the present invention. The foil transfer tool 60 is mounted on the carriage 21 (see FIG. 1). The foil transfer tool 60 is disposed above the fixture 20. The foil transfer tool 60 presses at least the foil securing film 75 and the thermal transfer foil 82 placed on the transfer object 80. The foil transfer tool 60 emits light to the foil securing film 75. In the present preferred embodiment, the foil transfer tool 60 presses the thermal transfer foil 82, the light absorbing film 76, and the foil securing film 75. The light emitted to the foil securing film 75 passes through the foil securing film 75 and reaches the light absorbing film 76. The foil transfer tool 60 emits light that heats the thermal transfer foil 82. The foil transfer tool 60 includes the light source 62, a pen body 61, and a presser 66. The presser 66 is secured to the lower end of the pen body 61.

The light source 62 emits light that serves as a heat source for the light absorbing layer of the thermal transfer foil 82 and/or the light absorbing film 76 through the foil securing film 75. The light source 62 is disposed in the housing 12. The light emitted to the light absorbing layer of the thermal transfer foil 82 and/or the light absorbing film 76 is converted into thermal energy through the light absorbing layer and/or the light absorbing film 76. This heats the thermal transfer foil 82. The light source 62 according to the present preferred embodiment includes a laser diode (LD) and an optical system, for example. The light source 62 is connected to the controller 90. The controller 90 performs switching between an ON state where the light source 62 emits laser light and an OFF state where the light source 62 stops emitting the laser light. In addition, the controller 90 controls, for example, energy of the laser light. Because laser light has a high response speed, the controller 90 is not only able to switch the ON state and the OFF state in an instant but also able to change, for example, energy of the laser light in an instant. Thus, the light source 62 is able to emit laser light having predetermined properties to the light absorbing layer of the thermal transfer foil 82 and/or the light absorbing film 76.

The pen body 61 has an elongated cylindrical shape. The pen body 61 is disposed such that the longitudinal direction of the pen body 61 corresponds to the up-down direction. The axis of the pen body 61 extends in the up-down direction. The pen body 61 houses a portion of the optical fiber 64 and a ferrule 65. The pen body 61 includes a holder 68 (which will be described below). The holder 68 is attached to the lower end of the pen body 61.

The optical fiber 64 is a fiber optical transmission medium through which light emitted from the light source 62 is to be transmitted. The optical fiber 64 includes: a core (not illustrated) through which light passes; and a cladding (not illustrated) that surrounds the periphery of the core so as to reflect light. The optical fiber 64 is connected to the light source 62. The optical fiber 64 includes an upper end e1 extending out of the pen body 61. The end e1 of the optical fiber 64 is inserted into a connector 62a attached to the light source 62. Such an arrangement connects the optical fiber 64 to the light source 62 such that optical loss is significantly reduced or minimized. The optical fiber 64 further includes a lower end e2. The ferrule 65 is fitted to the lower end e2 of the optical fiber 64. The ferrule 65 is a cylindrical optical connector. The ferrule 65 is provided with a through hole 65h passing through the ferrule 65 along the axis of the ferrule 65. The end e2 of the optical fiber 64 is inserted into the through hole 65h of the ferrule 65. The optical fiber 64 is an example of a light guide.

The pen body 61 includes the holder 68. The holder 68 holds the ferrule 65 at a predetermined location on the lower end of the pen body 61. The holder 68 has a cap shape. The holder 68 includes a cylindrical upper portion having an outer diameter equal to or substantially equal to the outer diameter of the pen body 61. The holder 68 includes a lower portion provided with a cylindrical protrusion 68g having an outer diameter smaller than the outer diameter of the pen body 61. The protrusion 68g is provided with a ferrule retainer 68f. The ferrule retainer 68f is a cylindrical recess. The ferrule retainer 68f has an inner diameter equal to or substantially equal to the outer diameter of the ferrule 65. The ferrule retainer 68f houses the lower end of the ferrule 65.

The holder 68 is provided with a hole P passing through the holder 68 in the up-down direction. A portion of the core of the optical fiber 64 located in the end e2 is exposed to the outside of the holder 68 through the hole P. In other words, the portion of the core of the optical fiber 64 located in the end e2 overlaps with the hole P when the holder 68 is viewed from below. Thus, the holder 68 does not interfere with a laser light optical path L. This allows the laser light emitted from the light source 62 to exit the pen body 61 from the lower end thereof.

The holder 68 also holds the presser 66 at a predetermined location on the lower end of the pen body 61. The presser 66 will be described below. The presser 66 presses at least the foil securing film 75 and the thermal transfer foil 82. In the present preferred embodiment, the presser 66 further presses the light absorbing film 76. The presser 66 is attachable to and detachable from the holder 68. In the present preferred embodiment, the presser 66 has a spherical shape. The presser 66 is made of a hard material. Although the hardness of the presser 66 is not limited to any particular hardness, the presser 66 is made of a material having a Vickers hardness of about 100 $HV_{0.2}$ or more, for example. The presser 66 is preferably made of a material having a Vickers hardness of about 500 $HV_{0.2}$ or more. The holder 68 holds the presser 66 on the laser light optical path L. The presser 66 is made of a material that allows the light emitted from the light source 62 to pass therethrough. This enables the laser light to pass through the presser 66 although the presser 66 is disposed on the optical path L. In one example, the presser 66 may be made of glass. The presser 66 according to the present preferred embodiment is made of synthetic quartz glass.

As used herein, the phrase "to allow laser light to pass therethrough" refers to having a predetermined laser light transmittance. Specifically, the phrase "to allow laser light to pass through the presser 66" refers to having a predetermined laser light transmittance through the presser 66, and the phrase "to allow laser light to pass through the foil securing film 75" refers to having a predetermined laser light transmittance through the foil securing film 75. In one example, the predetermined laser light transmittance is about 50% or more, for example. The predetermined laser light transmittance is preferably about 70% or more, for example. The predetermined laser light transmittance is more preferably about 80% or more, for example. The predetermined laser light transmittance is particularly preferably about 85% or more, for example. The predetermined laser light transmittance is most preferably about 90% or more, for example. As used herein, the term "transmittance" refers to a transmittance measured in accordance with, for example, JIS R3106: 1998 in such a manner that a surface reflection loss for a sample having a predetermined thickness (e.g., about 10 mm) is included.

As illustrated in FIG. 1, the film retainer 70 is disposed on the bottom wall 14. The film retainer 70 retains at least the foil securing film 75. In the present preferred embodiment, the film retainer 70 retains not only the foil securing film 75 but also the light absorbing film 76 disposed under the foil securing film 75 (i.e., on the underside of the foil securing film 75). The film retainer 70 moves at least the foil securing film 75 in the up-down direction relative to the fixture 20. In the present preferred embodiment, the film retainer 70 moves the foil securing film 75 and the light absorbing film 76 in the up-down direction relative to the fixture 20. The film retainer 70 includes a supporting plate 71, a retaining frame 72, slide bars 73, and a stopper 78.

Figure 5:
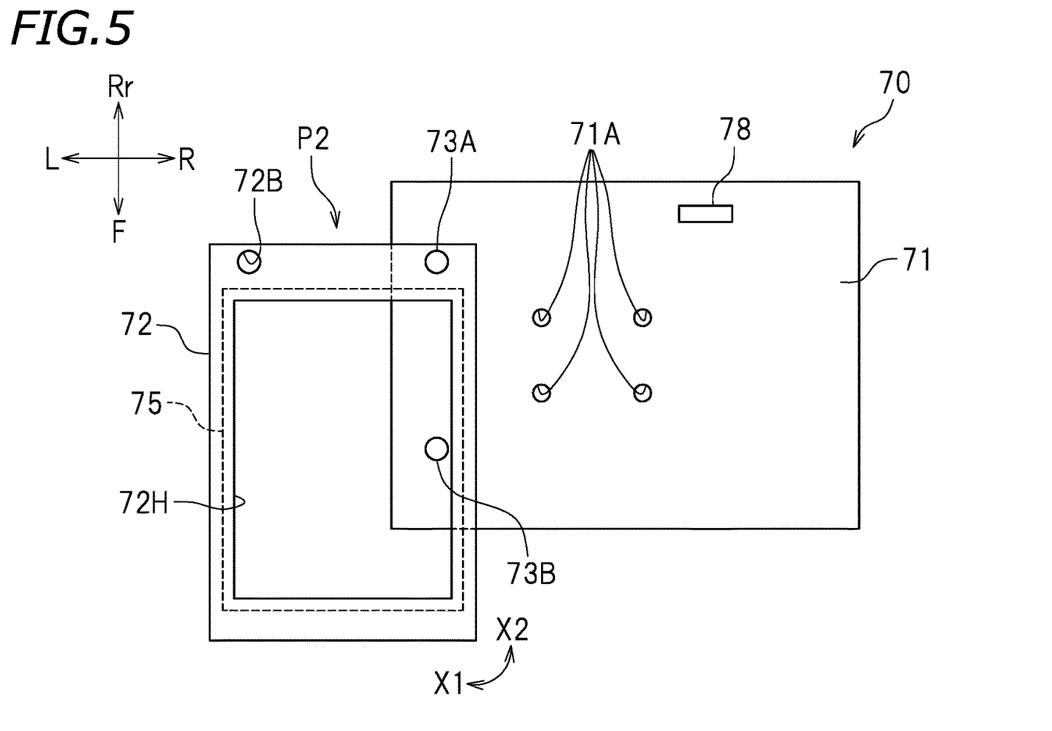
FIG. 5 is a schematic plan view of a film retainer according to the first preferred embodiment of the present invention.

As illustrated in FIG. 1, the supporting plate 71 is disposed on the bottom wall 14. Specifically, the supporting plate 71 is disposed on the retainer placement region 14b of the bottom wall 14. The supporting plate 71 has a flat plate shape. As illustrated in FIG. 5, the supporting plate 71 is provided with four mounting holes 71A, for example, to mount of the fixture 20 on the supporting plate 71.

As illustrated in FIG. 1, the slide bars 73 include a first slide bar 73A and a second slide bar 73B. The first and second slide bars 73A and 73B extend upward from the supporting plate 71. The first and second slide bars 73A and 73B extend upward from the left end of the supporting plate 71. Alternatively, the first and second slide bars 73A and 73B may extend upward from the right end of the supporting plate 71. The first slide bar 73A is disposed rearward of the second slide bar 73B. The first and second slide bars 73A and 73B are disposed in parallel or substantially in parallel with each other. The length of the first slide bar 73A in the up-down direction is longer than the length of the second slide bar 73B in the up-down direction.

The retaining frame 72 retains the foil securing film 75 and the light absorbing film 76. As illustrated in FIG. 1, the retaining frame 72 is slidable along the first and second slide bars 73A and 73B. The retaining frame 72 is movable in the up-down direction. The retaining frame 72 is disposed above the supporting plate 71. As illustrated in FIG. 3, the retaining frame 72 is provided with a first through hole 72A and a second through hole 72B. The first slide bar 73A is inserted through the first through hole 72A. The second slide bar 73B is inserted through the second through hole 72B. Moving the retaining frame upward by a predetermined distance enables removal of the second slide bar 73B from the second through hole 72B. When the second slide bar 73B is removed from the second through hole 72B, the retaining frame 72 is supported by only the first slide bar 73A. As illustrated in FIG. 5, removal of the second slide bar 73B from the second through hole 72B enables the retaining frame 72 to rotate around the first slide bar 73A in the direction of an arrow X1 and the direction of an arrow X2 in FIG. 5. Thus, removal of the second slide bar 73B from the second through hole 72B enables the retaining frame 72 to rotate between a securing position P1 (see FIG. 6) and a maintenance position P2 (see FIG. 5). The securing position P1 is the position of the retaining frame 72 when the thermal transfer foil 82 is secured to the transfer object 80 with the foil securing film 75. When the retaining frame 72 is located at the securing position P1, the first slide bar 73A is inserted through the first through hole 72A, and the second slide bar 73B is inserted through the second through hole 72B. The maintenance position P2 is the position of the retaining frame 72 when the foil securing film 75 retained by the retaining frame 72 is replaced, the fixture 20 is detached from the film retainer 70, or the transfer object 80 secured to the fixture 20 is detached from the fixture 20. When the retaining frame 72 is located at the maintenance position P2, the first slide bar 73A is inserted through the first through hole 72A but the second slide bar 73B is not inserted through the second through hole 72B. For the sake of convenience of description, the fixture 20 is not illustrated in FIG. 5 or FIG. 6.

Figure 6:
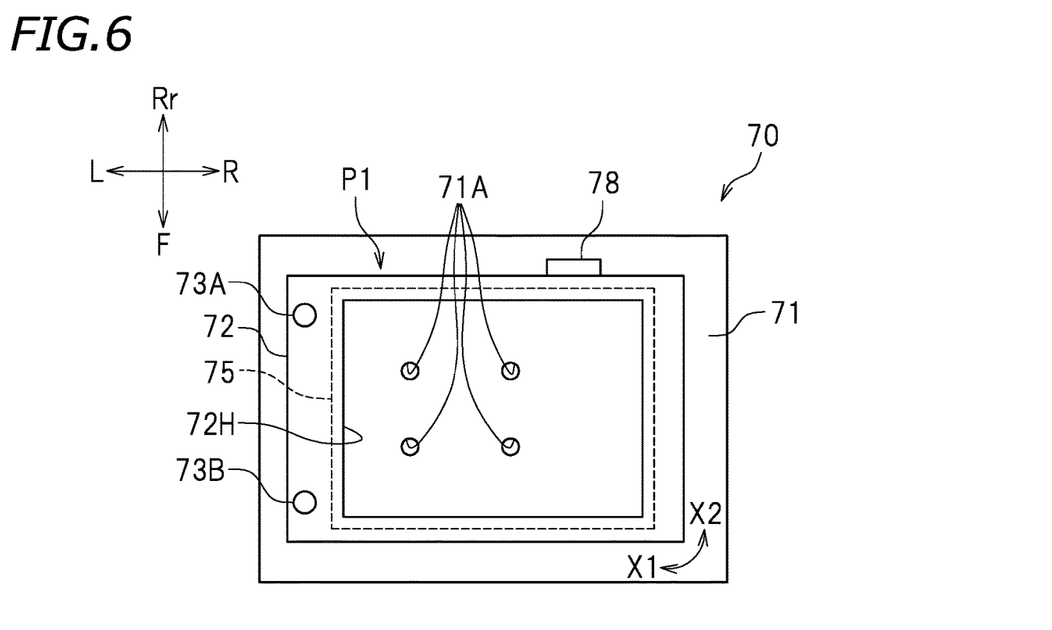
FIG. 6 is a schematic plan view of the film retainer according to the first preferred embodiment of the present invention.

As illustrated in FIG. 6, the retaining frame 72 is provided with an opening 72H passing through the retaining frame 72 in the up-down direction. The opening 72H has a rectangular shape, for example. The opening 72H is larger than the fixture 20. Specifically, the length of the opening 72H in the right-left direction is longer than the length of the fixture 20 in the right-left direction, and the length of the opening 72H in the front-rear direction is longer than the length of the fixture 20 in the front-rear direction. The fixture 20 and the opening 72H overlap with each other in a plan view. The fixture 20 is disposed inward of the opening 72H in the plan view. The foil securing film 75 is retained by the retaining frame 72 such that the foil securing film 75 overlaps with at least a portion of the opening 72H in the plan view. In the present preferred embodiment, the foil securing film 75 is larger than the opening 72H and is thus retained by the retaining frame 72 such that the foil securing film 75 overlaps with an entirety of the opening 72H in the plan view. In the present preferred embodiment, the foil securing film 75 is retained on the underside of the retaining frame 72. The foil securing film 75 may be retained by the retaining frame 72 in any suitable manner. In one example, the foil securing film is retained by the retaining frame 72 with a double-sided adhesive tape. The light absorbing film 76 is secured to the lower surface of the foil securing film 75. The light absorbing film 76 may be secured to the foil securing film 75 in any suitable manner. In one example, the light absorbing film 76 is secured to the foil securing film 75 with an adhesive that allows light to pass therethrough or a double-sided adhesive tape. When such a double-sided adhesive tape is used, the double-sided adhesive tape is disposed, for example, at a location where light emitted from the light source 62 of the foil transfer tool 60 does not pass. Although the foil securing film 75 presses the thermal transfer foil 82 from above, a large portion of the pressing force of the foil securing film 75 is produced by the weight of the retaining frame 72

The stopper 78 limits rotation of the retaining frame 72. As illustrated in FIG. 1, the stopper 78 extends upward from the supporting plate 71. The stopper 78 is disposed rearward of the first slide bar 73A. The upper end of the stopper 78 is located above the upper end of the second slide bar 73B. In one example, the upper end of the stopper 78 is located above the upper end of the first slide bar 73A. As illustrated in FIG. 6, the stopper 78 limits rotation of the retaining frame 72 in the direction of the arrow X2 in FIG. 6 when the retaining frame 72 is located at the securing position P1. With the retaining frame located at the securing position P1, the stopper 78 is in contact with the retaining frame 72. With the retaining frame 72 located at the securing position P1, moving the retaining frame upward by a predetermined distance enables removal of the second slide bar 73B from the second through hole 72B. Moving the retaining frame 72 from the maintenance position P2 (see FIG. 5) to the securing position P1 brings the retaining frame 72 into contact with the stopper 78. This causes the second through hole 72B to overlap with the second slide bar 73B in the plan view. In this state, moving the retaining frame 72 downward enables insertion of the second slide bar 73B through the second through hole 72B. Thus, the stopper 78 is also used to effect positioning of the second through hole 72B and the second slide bar 73B relative to each other.

The controller 90 controls all operations of the thermal transfer apparatus 10. The controller 90 is communicably connected to the Z-axis direction feed motor 32, the Y-axis direction feed motor 42, the X-axis direction feed motor 52, and the light source 62. The controller 90 is configured or programmed to control the Z-axis direction feed motor 32, the Y-axis direction feed motor 42, the X-axis direction feed motor 52, and the light source 62. The controller 90 is typically a computer. In one example, the controller 90 includes: an interface (I/F) to receive foil transfer data and other data from an external device, such as a host computer; a central processing unit (CPU) to execute a command of a control program; a read-only memory (ROM) to store the program to be executed by the CPU; a random-access memory (RAM) to be used as a working area where the program is to be expanded; and a storage (such as a memory) to store the program and various other data.

A procedure for foil transfer will be described below. The first step is to move the retaining frame 72 to the maintenance position P2 as illustrated in FIG. 5. Then, the fixture 20 retaining the transfer object 80 is attached onto the supporting plate 71. The next step is to place the thermal transfer foil 82 on the transfer object 80. The procedure then involves rotating the retaining frame 72 to the securing position P1 (see FIG. 6) so as to allow insertion of the second slide bar 73B through the second through hole 72B. The subsequent step is to move the retaining frame 72 downward so as to cause the foil securing film to press the thermal transfer foil 82 through the light absorbing film 76. Thus, the thermal transfer foil 82 is sandwiched between the transfer object 80 and the foil securing film 75. This prevents movement of the thermal transfer foil 82 relative to the transfer object 80.

As previously described, the controller 90 effects foil transfer in accordance with the foil transfer data, with the thermal transfer foil 82 secured to the transfer object 80. As used herein, the term "foil transfer data" refers to data (such as a pattern) input by the user. In one example, the foil transfer data is expressed in the form of raster data. The controller 90 drives the Z-axis direction feed motor 32, the Y-axis direction feed motor 42, and the X-axis direction feed motor 52 so as to move the foil transfer tool 60. In one example, the controller 90 causes the presser 66 of the foil transfer tool 60 to press the foil securing film 75, the light absorbing film 76, and the thermal transfer foil 82 in accordance with the foil transfer data. The controller 90 actuates, at a predetermined time, the light source 62 in accordance with the foil transfer data so as to emit laser light to the foil securing film 75 from the foil transfer tool 60. The controller 90 drives the Y-axis direction feed motor 42 so as to move the foil transfer tool 60 in the front-rear direction relative to the transfer object 80 in accordance with the foil transfer data. The controller 90 drives the X-axis direction feed motor 52 so as to move the foil transfer tool 60 in the right-left direction relative to the transfer object 80 in accordance with the foil transfer data. The controller 90 drives the Z-axis direction feed motor 32 so as to move the foil transfer tool 60 in the up-down direction relative to the transfer object 80 in accordance with the foil transfer data.

During foil transfer, the laser light emitted from the light source 62 passes through the foil securing film 75 and reaches the light absorbing film 76, and a portion of the light absorbing film 76 irradiated with the laser light absorbs the laser light so as to convert light energy into thermal energy. This causes the light absorbing film 76 to generate heat, so that the heat is conducted to the adhesive layer of the thermal transfer foil 82. The heat conducted softens the adhesive layer so as to cause the adhesive layer to exhibit adhesiveness. Thus, the adhesive layer adheres to the surface of the decorative layer and the surface of the transfer object 80. This brings the decorative layer into intimate contact with the transfer object 80. Then, the foil transfer tool 60 is moved or the light source 62 stops emitting laser light, so that supply of light energy to the adhesive layer from the light absorbing film 76 ends. This induces heat dissipation of the adhesive layer so as to cool and harden the adhesive layer. The hardening of the adhesive layer results in fixation of the decorative layer to the surface of the transfer object 80. The user subsequently moves the retaining frame 72 from the securing position P1 (see FIG. 6) to the maintenance position P2 (see FIG. 5) and removes the base of the thermal transfer foil 82 from the surface of the transfer object 80. This provides an article having on its surface a desired pattern, for example, thermally transferred thereto.

As described above, the thermal transfer apparatus 10 according to the present preferred embodiment enables the film retainer 70 to move the foil securing film 75 in the up-down direction relative to the fixture 20. Thus, with the thermal transfer foil 82 placed on the transfer object 80 retained by the fixture 20, moving the foil securing film 75 downward enables the foil securing film 75 to press the thermal transfer foil 82 from above. This secures the thermal transfer foil 82 onto the transfer object 80 so as to prevent movement of the thermal transfer foil 82 relative to the transfer object 80. Because the foil securing film 75 allows light to pass therethrough, light emitted to the foil securing film 75 from the foil transfer tool 60 passes through the foil securing film 75 and reaches the thermal transfer foil 82. This heats the thermal transfer foil 82 so as to transfer the thermal transfer foil 82 to the transfer object 80. Consequently, the thermal transfer apparatus 10 according to the present preferred embodiment effects foil transfer while reliably securing the thermal transfer foil 82 to the transfer object 80 with the foil securing film 75.

The foil transfer tool 60 of the thermal transfer apparatus 10 according to the present preferred embodiment presses the thermal transfer foil 82, the light absorbing film 76, and the foil securing film 75. This enables the light absorbing film to efficiently convert light energy emitted from the foil transfer tool 60 into thermal energy so as to sufficiently heat the thermal transfer foil 82.

The film retainer 70 of the thermal transfer apparatus 10 according to the present preferred embodiment retains the foil securing film 75 and the light absorbing film 76. This enables the light absorbing film 76 to be reliably secured to the thermal transfer foil 82.

The foil securing film 75 of the thermal transfer apparatus 10 according to the present preferred embodiment is retained by the retaining frame 72 such that the foil securing film 75 overlaps with at least a portion of the opening 72H provided in the retaining frame 72. Thus, securing the thermal transfer foil 82 to the transfer object 80 with the foil securing film 75 enables the thermal transfer foil 82 to conform to the shape of the transfer object 80.

The thermal transfer apparatus 10 according to the present preferred embodiment is structured such that upward movement of the retaining frame 72 and resulting removal of the second slide bar 73B from the second through hole 72B enable rotation of the retaining frame 72 around the first slide bar 73A. The rotation of the retaining frame 72 makes it possible to prevent the retaining frame 72 from being located over the fixture 20. Thus, the present preferred embodiment further facilitates operations involving disposing the fixture 20 on the supporting plate 71 of the film retainer 70 and causing the fixture 20 to retain the transfer object 80.

The thermal transfer apparatus 10 according to the present preferred embodiment is structured such that the second through hole 72B and the second slide bar 73B overlap with each other in the plan view when the retaining frame 72 is in contact with the stopper 78. Accordingly, moving the retaining frame 72 downward inserts the second slide bar 73B through the second through hole 72B. Thus, the second slide bar 73B is easily re-insertable through the second through hole 72B of the retaining frame 72 that has been rotated.

The foil transfer tool 60 of the thermal transfer apparatus 10 according to the present preferred embodiment includes the presser 66 disposed on the holder 68 of the pen body 61.

The presser 66 presses the thermal transfer foil 82, the light absorbing film 76, and the foil securing film 75. The presser 66 is made of a material that allows laser light emitted from the light source 62 to pass therethrough. Because the presser 66 allows laser light to pass therethrough, the laser light is emitted to a portion of the foil securing film 75 pressed by the presser 66. Thus, the amount of heat necessary for foil transfer is generated in the light absorbing film 76 placed under the foil securing film 75. This enables more accurate transfer of the thermal transfer foil 82 to the transfer object 80.

The presser 66 of the thermal transfer apparatus 10 according to the present preferred embodiment is attachable to and detachable from the holder 68 of the pen body 61. Because the presser 66 in use is brought into contact with the foil securing film 75, the presser 66 gradually wears away. The wearing away of the presser 66, however, does not require replacement of an entirety of the foil transfer tool 60 but requires only replacement of the presser 66. Consequently, a replacement operation is performed more easily at a lower cost than when the entirety of the foil transfer tool 60 is replaced.

In the foregoing preferred embodiment, the film retainer 70 retains the foil securing film 75 and the light absorbing film 76. The film retainer 70, however, does not necessarily have to retain both of the foil securing film 75 and the light absorbing film 76. Alternatively, the film retainer 70 may retain only the foil securing film 75. In such a case, the light absorbing film 76 may be placed on the thermal transfer foil 82.

In the foregoing preferred embodiment, the thermal transfer apparatus 10 involves using the light absorbing film 76. When the thermal transfer foil 82 includes the light absorbing layer described above, however, the thermal transfer apparatus 10 does not necessarily have to involve using the light absorbing film 76.

Second Preferred Embodiment

Figure 7:
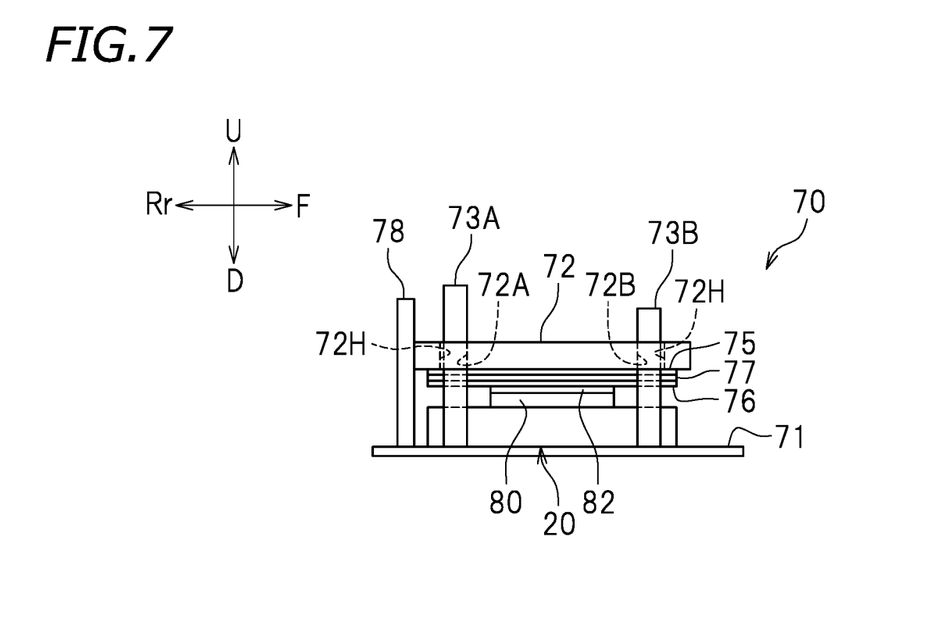
FIG. 7 is a schematic left side view of a film retainer according to a second preferred embodiment of the present invention.

FIG. 7 is a schematic left side view of the film retainer according to a second preferred embodiment of the present invention. As illustrated in FIG. 7, the film retainer 70 retains the foil securing film 75; the light absorbing film 76 disposed below the foil securing film 75; and a decorative film 77 disposed between the foil securing film 75 and the light absorbing film 76. The film retainer 70 moves the foil securing film 75, the decorative film 77, and the light absorbing film 76 in the up-down direction relative to the fixture 20.

The decorative film 77 is used to cause the decorative layer, which is to be transferred to the transfer object 80 during transfer of the thermal transfer foil 82 to the transfer object 80, to have an uneven shape. In other words, the use of the decorative film 77 makes it possible to emboss the transfer object 80. The decorative film 77 has an uneven surface. The decorative film 77 is significantly lower in light absorptivity than the light absorbing film 76. The decorative film 77 allows light to pass therethrough. In one example, the decorative film 77 is transparent. The decorative film 77 is higher in strength than the light absorbing film 76. A material for the decorative film 77 is not limited to any particular material. In one example, the decorative film 77 is a plastic film, such as a polyester film.

Light emitted from the light source 62 of the foil transfer tool 60 passes through the foil securing film 75 and the decorative film 77 and reaches the light absorbing film 76. In the present preferred embodiment, the thermal transfer foil 82 is pressed by the presser 66 of the foil transfer tool 60 through the light absorbing film 76, the decorative film 77, and the foil securing film 75. This causes the thermal transfer foil 82 to have an uneven shape corresponding to the uneven surface of the decorative film 77. Consequently, the decorative layer included in the thermal transfer foil 82 and having the uneven shape is transferred to the surface of the transfer object 80.

The decorative film 77 of the thermal transfer apparatus 10 according to the present preferred embodiment is disposed on the light absorbing film 76 and under the foil securing film 75. The foil transfer tool 60 presses the foil securing film 75, the decorative film 77, the light absorbing film 76, and the thermal transfer foil 82. During foil transfer, the decorative film 77 is pressed by the foil transfer tool 60. Thus, the decorative layer included in the thermal transfer foil 82 and having the uneven shape corresponding to that of the decorative film 77 is transferred to the transfer object 80. Consequently, the decorative film 77 disposed on the light absorbing film 76 as just described further improves the design of the transfer object 80.

In the foregoing preferred embodiment, the film retainer 70 retains the foil securing film 75, the decorative film 77, and the light absorbing film 76. The film retainer 70, however, does not necessarily have to retain all of these three films. In an alternative, the film retainer 70 may retain only the foil securing film 75. In such a case, the decorative film 77 and the light absorbing film 76 may be placed on the thermal transfer foil 82. In another alternative, the film retainer 70 may retain only the foil securing film 75 and the decorative film 77. In such a case, the light absorbing film 76 may be placed on the thermal transfer foil 82.

In the foregoing preferred embodiment, the decorative film 77 is disposed between the foil securing film 75 and the light absorbing film 76. In other words, the decorative film 77 is disposed on the light absorbing film 76. The decorative film 77 may be disposed at any other suitable location. The decorative film 77 may be disposed under the light absorbing film 76. In other words, the decorative film 77 may be disposed between the light absorbing film 76 and the thermal transfer foil 82.

Although the preferred embodiments of the present invention have been described thus far, the preferred embodiments described above are only illustrative. The present invention may be embodied in various other forms.

In each of the foregoing preferred embodiments, the length of the first slide bar 73A in the up-down direction is longer than the length of the second slide bar 73B in the up-down direction so as to enable rotation of the retaining frame 72 around the first slide bar 73A upon removal of the second slide bar 73B from the second through hole 72B. The present invention, however, is not limited to such an arrangement. In an alternative example, the length of the first slide bar 73A in the up-down direction may be shorter than the length of the second slide bar 73B in the up-down direction so as to enable rotation of the retaining frame 72 around the second slide bar 73B upon removal of the first slide bar 73A from the first through hole 72A.

In each of the foregoing preferred embodiments, the weight of the retaining frame 72 produces a large portion of the pressing force of the foil securing film 75 to be exerted on the thermal transfer foil 82. To further increase the pressing force of the foil securing film 75, the film retainer 70 may further include an elastic member (such as a spring) to urge the retaining frame 72 downward (i.e., toward the fixture 20). Providing such an elastic member more reliably secures the thermal transfer foil 82 to the transfer object 80.

In each of the foregoing preferred embodiments, the thermal transfer apparatus 10 moves the foil transfer tool 60 relative to the fixture 20. The present invention, however, is not limited to this configuration. In an alternative example, the thermal transfer apparatus 10 may move the fixture 20 relative to the foil transfer tool 60. In another alternative example, both of the fixture 20 and the foil transfer tool 60 may be movable. In such an example, the fixture 20 may be movable in the X-axis direction, and the foil transfer tool 60 may be movable in the Y-axis direction and the Z-axis direction.

In each of the foregoing preferred embodiments, the presser 66 has a spherical shape. The presser 66, however, is not limited to this shape. In an alternative example, the presser 66 may have a semi-spherical shape or a cuboid shape.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A thermal transfer apparatus comprising:
   a stand to retain a transfer object;
   a foil securing film disposed above the stand to allow light to pass therethrough and to press, from above, a thermal transfer foil on the transfer object to secure the thermal transfer foil onto the transfer object;
   a film retainer to retain the foil securing film and to move the foil securing film in a vertical direction relative to the stand;
   a foil transfer tool to press the foil securing film and the thermal transfer foil on the transfer object and to emit light to the foil securing film; and
   a conveyor to move one of the stand and the foil transfer tool relative to the other one of the stand and the foil transfer tool.

2. The thermal transfer apparatus according to claim 1, further comprising a light absorber disposed under the foil securing film, wherein
   the foil transfer tool is structured to press the thermal transfer foil, the light absorber, and the foil securing film.

3. The thermal transfer apparatus according to claim 2, wherein
the light absorber is affixed to the foil securing film; and
the film retainer retains the foil securing film and the light absorber.

4. The thermal transfer apparatus according to claim 2, further comprising a decorative film disposed on or under the light absorber, the decorative film including an uneven surface, wherein
the foil transfer tool is structured to press the thermal transfer foil, the light absorber, the decorative film, and the foil securing film.

5. The thermal transfer apparatus according to claim 2, wherein the light absorber is a light absorbing film.

6. The thermal transfer apparatus according to claim 1, wherein
the film retainer includes:
at least one slide bar extending in the vertical direction; and
a retaining frame slidable along the at least one slide bar, the retaining frame including an opening passing through the retaining frame in the vertical direction; and
the foil securing film is retained by the retaining frame such that the foil securing film overlaps with at least a portion of the opening in a plan view.

7. The thermal transfer apparatus according to claim 6, wherein
the at least one slide bar includes:
a first slide bar extending in the vertical direction; and
a second slide bar extending in the vertical direction, the second slide bar being disposed in parallel or substantially in parallel with the first slide bar;
a length of the second slide bar in the vertical direction is shorter than a length of the first slide bar in the vertical direction;
the retaining frame includes:
a first through hole to receive the first slide bar; and
a second through hole to receive the second slide bar; and
upward movement of the retaining frame and resulting removal of the second slide bar from the second through hole enable rotation of the retaining frame around the first slide bar.

8. The thermal transfer apparatus according to claim 7, wherein
the film retainer includes a stopper to limit rotation of the retaining frame; and
contact of the retaining frame with the stopper causes the second through hole to overlap with the second slide bar in the plan view.

9. The thermal transfer apparatus according to claim 1, wherein
the foil transfer tool includes:
a hollow pen body including an extremity;
a presser disposed on the extremity of the pen body to press at least the thermal transfer foil and the foil securing film;
a light guide at least partially disposed in the pen body and including a first end and a second end; and
a light source connected to the first end of the light guide;
the second end of the light guide is disposed in the extremity of the pen body such that the second end of the light guide faces the presser in the pen body; and
the presser is made of a material that allows light emitted from the light source to pass therethrough.

10. The thermal transfer apparatus according to claim 9, wherein the presser is attachable to and detachable from the extremity of the pen body.

* * * * *